March 15, 1938.  V. F. ZAHODIAKIN  2,111,258

PISTON RING EXPANDER

Filed Jan. 15, 19

INVENTOR.
BY
ATTORNEYS

Patented Mar. 15, 1938

2,111,258

UNITED STATES PATENT OFFICE 2,111,258

PISTON RING EXPANDER

Victor F. Zahodiakin, New York, N. Y., assignor to The Z-Flex Piston Ring Corporation, New York, N. Y., a corporation of New Jersey Application January 15, 1936, Serial No. 59,257

7 Claims. (Cl. 309—40)

This invention relates to pistons, and is particularly directed to expander rings adapted to be placed behind sealing rings of the type used in connection with the pistons of internal combustion engines for forcing the piston rings outwardly into sealing engagement with the cylinder wall. These expander rings have particular use for application to the piston rings after the piston rings have become worn and fail to maintain the proper seal with the cylinder wall. Piston rings in worn condition permit loss of compression past the piston and escape of oil into the combustion chamber, thus greatly lowering the efficiency of the engine.

There have been expander rings developed heretofore for this purpose, but they have lacked effectiveness to a considerable extent for the reason that they have not provided uniform and continuous application of pressure throughout the entire circumference of the ring and have had a tilting or tipping effect on the piston ring. As examples of the type of structures which the present invention is designed to improve, reference may be made to the Brownfield Patent No. 1,516,327, issued November 18, 1924, and the Howe Patent No. 1,592,887, issued July 20, 1926.

It is the object of the present invention to provide a piston ring expanding device, which is in the form of a ring which embodies resilient means, engaging the piston ring at extremely closely spaced points for evenly distributed and substantially continuous pressure thereon entirely around the circumference of the ring, and which contacts the piston ring uniformly above and below a plane, medially of and parallel with the top and bottom walls of the piston ring.

It is a further object of this invention to provide an expander ring which is adapted to be interposed between the piston ring and the piston. This expander ring is readily stamped and bent to provide resilient members which uniformly engage, the inner periphery of the ring or the adjacent portion of the piston within the piston ring groove, and the contact portions of which are rounded in order to provide ball ends thus eliminating all unnecessary friction and causing less wear due to reduction in area of contacting surfaces.

Other objects and certain advantages will be more fully apparent from a description of the accompanying drawing, in which.

Figure 1:
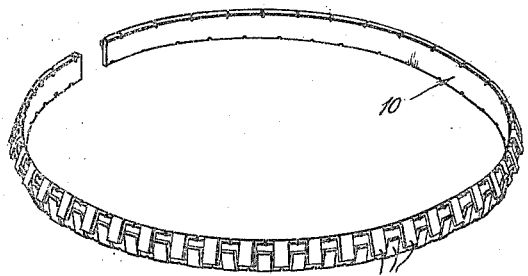
Figure 1 is a perspective view of the improved expander ring of this invention.
Figure 4:
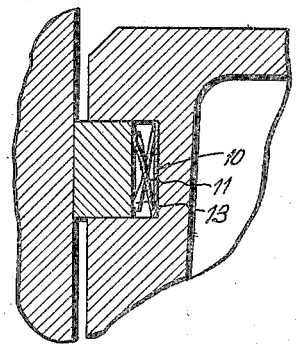
Figure 4 is a fragmentary sectional view taken through a piston and cylinder, showing the expander ring assembled in relation to the piston ring and piston.

Referring to the drawing, it will be observed that the piston ring expander in each embodiment shown provides spring members or prongs formed transversely of the expander ring structure and alternating as to direction. This provides a criss-cross arrangement of prongs (when viewed as shown in Figure 4) so that alternate prongs or spring members engage the piston ring adjacent its top surface, and the remaining prongs engage the inner periphery of the piston ring adjacent the bottom surface of the piston ring.

By virtue of this arrangement it will be observed that the contact points of the expander ring engage the piston ring uniformly at each side of the plane intermediate the top and bottom surfaces thereof. This arrangement assures uniformity of pressure. In other words, there is no tendency to rock the piston ring or to tip it when it is regarded in a transverse plane. That is, if the contacts were unbalanced, as has been the case in the prior art, the top portion of the outer periphery of the piston ring would have a greater contact pressure with the cylinder wall than the bottom portion, or vice versa.

The present invention eliminates all possibility of canting of the piston ring, and cures the fault of the existing rings. In the previous structures, in some cases the expanding force was applied to a greater extent toward one side of the piston ring than the other, or it was applied only centrally thereof, either of which structures did not stabilize the piston ring and hold it in uniform contact with the cylinder wall.

Moreover, the present invention, as will be observed in all embodiments, provides a multiplicity of contact points around the circumference of the ring. The prongs, as formed, are closely spaced, so that it may be said that the expanding pressure is applied locally as well as generally. Furthermore, ample clearance is provided between the respective prongs so that there is no interference with their movement; that is, they are free to flex and perform their expanding function independently of each other.

The ends of the prongs in the operation of forming up the prongs are depressed to form ball ends so that the contact with the piston ring is reduced to a minimum with consequent reduction in friction and amount of wear. The expander device operates much more freely with this structure embodied, and the independence of prong action is fully maintained.

It will also be noted that the rings are formed up by stamping and bending and in some of the forms solely by stamping with respect to the prongs. In other words, certain of the modifications simply require one pass of forming and punching dies.

Figure 2:
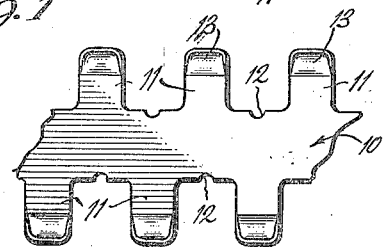
Figure 2 is a fragmentary view of a portion of the ring, showing it stamped and in condition prior to bending of the yieldable contact fingers into their normal position.
Figure 3:
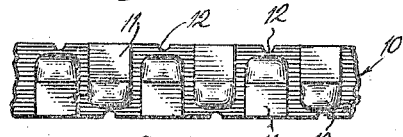
Figure 3 is a fragmentary view of the ring similar to Figure 2, but showing the ring, as completed, with the fingers bent into their position of use.

Referring to the drawing in detail, the expander ring is generally indicated at 10, and the resilient members or prongs, at 11. As shown in Figure 2, the ring may be formed by stamping from a strip of spring steel. The formed prongs are staggered so that when bent over the outer periphery of the ring, as shown in Figure 4, they provide a criss-cross arrangement of prongs, that is, the prongs alternate as to direction.

In the operation of stamping out the ring, oil passageways are provided in the form of notches 12 between the prongs at the top and bottom edges of the ring. The spaces between prongs are greater than the width of the prongs, so that ample clearance is provided for free independent flexing of each prong. As a further part of the stamping operation, the prongs are depressed to provide ball ends 13, the convex portions of which will face outwardly when the prongs are bent into position. Thus a more efficient sliding contact with the piston ring is provided. The amount of contact is reduced and less wear will occur.

Figure 6:
Figure 6 is a sectional view taken on line 6—6, Fig. 5, further illustrating the modified expander ring.
Figure 5:
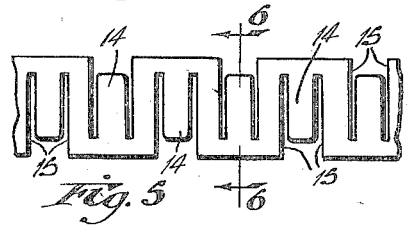
Figure 5 is a fragmentary view of a portion of a modified ring showing the prongs formed in a different manner and from stock of narrower width.

In the matter of the modification, shown in Figures 5 and 6, prongs 14 are formed directly from or within the width of the strip of material selected. This is accomplished by cutting parallel slots 15—15 at spaced intervals transversely relative to the top and bottom edges of the ring respectively. These pairs of spaced slots are alternating with respect to the edges into which they are cut. The transverse slots stop a sufficient distance short of the opposite edge of the ring to leave enough material for general ring strength.

In the same pass which cuts the notches or slot, the fingers 14 represented by the material between the slots of each pair are bent into the position shown in the sectional view, Figure 6. Alternate prongs are bent in the same direction so that the same arrangement of criss-cross prongs is accomplished as in the preceding form.

Figure 8:
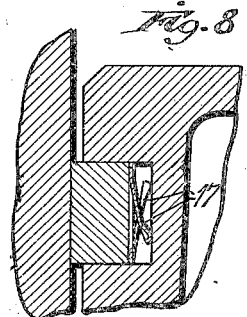
Figure 8 is a sectional view taken through a piston and cylinder combination, showing the expander ring interposed between the piston and piston ring with the prongs extending inwardly against the piston.
Figure 7:
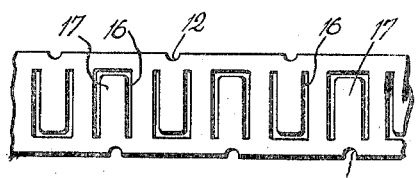
Figure 7 is a fragmentary view of a portion of a further modified ring, showing the resilient prongs or spring members stamped from within the body of the ring.

In the matter of the modification shown in Figures 7 and 8, the slots 16 are closed and of U-shape. In other words, instead of being cut in from, the edge as in the preceding form they are provided entirely within the body of the ring. The same arrangement of prongs prevails, since alternate U-shaped slots may be regarded as inverted in relation to the others, and the prongs 17 are bent accordingly into a criss-cross arrangement (see Figure 8).

In Figure 8, the expander ring is formed with the criss-cross prongs extended from the inner periphery thereof so as to engage the piston instead of the piston ring, or more specifically the adjacent wall of the piston ring groove.

Having described my invention, I claim:

1. An expander for piston rings, comprising, a ring having fingers extending across one face thereof and forming an angle therewith, alternate fingers formed at opposite edges of the ring whereby alternate fingers are disposed in opposite directions for uniform application of pressure to a piston ring.

2. An expander for piston rings, comprising, a ring having prongs extending across a face thereof and forming an angle therewith, alternate prongs being formed at opposite edges of the ring, whereby the prongs are disposed in opposite directions for uniform application of pressure to a piston ring, the ends of said prongs having a ball formation with the convex sides thereof disposed outwardly for contact.

3. A piston ring expander, comprising, a ring structure embodying transversely extended prongs disposed across its outer periphery angularly in relation thereto, said prongs alternating as to direction providing for contact with a piston ring uniformly above and below a plane centrally located between the top and bottom surfaces thereof.

4. An expander device for piston rings, comprising, a ring having prongs extending from the edges thereof with alternate prongs extending from opposite edges angularly with respect to the ring structure and appearing in crisscross arrangement when the ring is viewed in transverse section, the spaces between alternate prongs being greater than the width of each prong so as to provide ample clearance for free flexing action of the prongs in use.

5. An expander device for piston rings, comprising, a ring having pairs of parallel spaced slots cut in from opposite edges thereof alternately, with the metal intermediate the slot of each pair bent outwardly to dispose these portions of the metal angularly with respect to the body of the ring.

6. An expander for piston rings, comprising, a ring having prongs extending across one face thereof and forming an angle therewith, alternate prongs formed from opposite edges whereby the prongs are disposed in crisscross arrangement for uniform application of pressure to a piston ring, and said ring having oil grooves cut in its edges between the prongs.

7. A piston ring expander comprising, a ring structure having prongs extending transversely across one periphery thereof, said prongs disposed angularly with respect to said periphery so as to have their ends outwardly disposed, said prongs alternate as to direction and providing for contact with a piston ring uniformly above and below a plane centrally located between the top and bottom surfaces thereof.

VICTOR F. ZAHODIAKIN.